United States Patent
Toutain et al.

(10) Patent No.: US 7,805,534 B2
(45) Date of Patent: Sep. 28, 2010

(54) SERVICE FOR PERSONALIZING COMMUNICATIONS BY PROCESSING AUDIO AND/OR VIDEO MEDIA FLOWS

(75) Inventors: Francois Toutain, Louannec (FR); Vincent Teze, Landeda (FR); Claude Daloz, Lannion (FR)

(73) Assignee: France Telecom, Paris (FR)

( * ) Notice: Subject to any disclaimer, the term of this patent is extended or adjusted under 35 U.S.C. 154(b) by 300 days.

(21) Appl. No.: 11/997,592

(22) PCT Filed: Aug. 1, 2006

(86) PCT No.: PCT/FR2006/001884

§ 371 (c)(1),
(2), (4) Date: Jul. 9, 2008

(87) PCT Pub. No.: WO2007/015012

PCT Pub. Date: Feb. 8, 2007

(65) Prior Publication Data

US 2009/0222570 A1    Sep. 3, 2009

(30) Foreign Application Priority Data

Aug. 1, 2005    (FR)    ................................. 05 08218

(51) Int. Cl.
*G06F 15/16*    (2006.01)
*G06F 12/00*    (2006.01)
(52) U.S. Cl. ..................................... 709/231; 709/246
(58) Field of Classification Search ......... 709/230–237, 709/246, 250–251
See application file for complete search history.

(56) References Cited

U.S. PATENT DOCUMENTS

| 2004/0031058 A1* | 2/2004 | Reisman | ................ 725/112 |
| 2004/0174431 A1* | 9/2004 | Stienstra | ................ 348/155 |
| 2005/0005308 A1* | 1/2005 | Logan et al. | ............ 725/135 |

(Continued)

FOREIGN PATENT DOCUMENTS

EP    0 717 545    6/1996

(Continued)

OTHER PUBLICATIONS

French Search Report from counterpart foreign Application No. FR 05/08218 filed on Aug. 1, 2005.

(Continued)

*Primary Examiner*—Zarni Maung
(74) *Attorney, Agent, or Firm*—David D. Brush; Westman, Champlin & Kelly, P.A.

(57) ABSTRACT

A method is provided for the exchange of media flows between a terminal used by a user and a connection termination during the same session of interpersonal communication. The method includes a personalization step for running a personalization program associated with an activation command by a personalization table, following the selection of the activation command by the user, for the personalization of exchanged media flows. The method includes a step for the transmission of the exchanged media flows that can be personalization at least one relay address previously defined for the personalization of the flows, and a step for the retransmission, from the relay address, of the flows oriented towards the termination, the flows being personalized or not according to whether the personalization step has been carried out or not.

20 Claims, 6 Drawing Sheets

U.S. PATENT DOCUMENTS

2005/0060755 A1* 3/2005 Daniels .................... 725/134
2005/0135583 A1  6/2005 Kardos ................. 379/142.01
2006/0037057 A1* 2/2006 Xu ............................. 725/90

FOREIGN PATENT DOCUMENTS

EP          0 717 545 A2    6/1996

OTHER PUBLICATIONS

International Search Report from counterpart foreign Application No. PCT/FR2006/001884 filed on Aug. 1, 2006.

International Preliminary Report on Patentability from counterpart foreign Application No. PCT/FR2006/001884 filed on Aug. 1, 2006.

* cited by examiner

SERVICE FOR PERSONALIZING COMMUNICATIONS BY PROCESSING AUDIO AND/OR VIDEO MEDIA FLOWS

CROSS-REFERENCE TO RELATED APPLICATIONS

This Application is a Section 371 National Stage Application of International Application No. PCT/FR2006/001884, filed Aug. 1, 2006 and published as WO 2007/015012 A1 on Feb. 8, 2007, not in English.

FIELD OF THE DISCLOSURE

The present disclosure relates to a method and a system for the exchange of media streams between a terminal used by a user and a connection termination during a same inter-personal communication session. The present disclosure also relates to a device for the personalizing of said media streams and a computer program implementing the steps of said method.

The field concerned by the present disclosure is that of inter-personal communications taking place in a communications network, for example of the switched telephone network (STN), integrated services digital network (ISDN), packet network (Internet, ATM, etc.) or wireless network type.

BACKGROUND OF THE DISCLOSURE

Figure 1A:
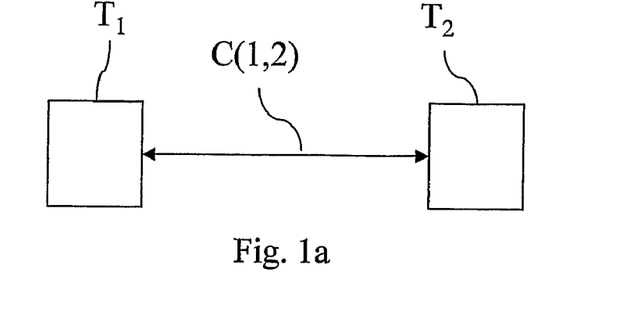
FIG. 1a is a drawing of a unicast communication.

Inter-personal communications encompass all types of unicast communications, i.e. referring to FIG. 1a, direct communications $C(1,2)$ between two terminals $T_1$ and $T_2$.

Figure 1B:
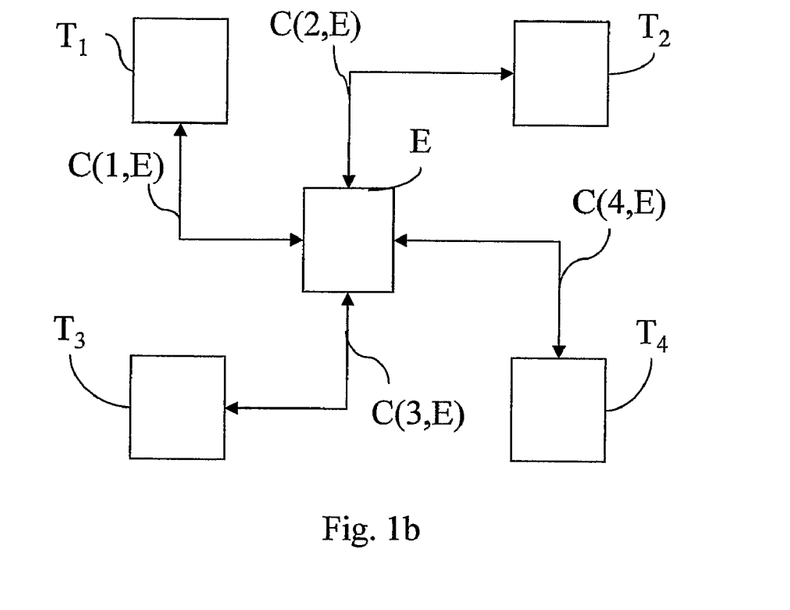
FIG. 1b is a drawing of a multicast communication.

Inter-personal communications also encompass all multicast communications, i.e. referring to FIG. 1b, communications between several terminals $T_1$, $T_2$, $T_3$ and $T_4$ connected by a unicast connection $C(i,E)$ ($i=1, \ldots, 4$) to a connection termination E such as for example a conference bridge or a multi-point control unit responsible for the mixing and broadcasting of media streams exchanged during a same inter-personal communications session.

Figure 1C:
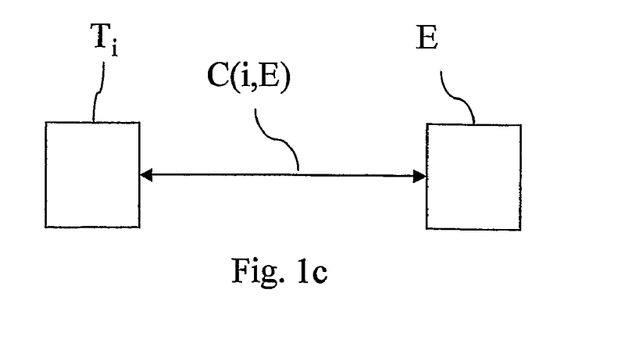
FIG. 1c is a generic drawing of an inter-personal communication.

As shall be seen here below, the present invention relating to unicast connection $C(i,E)$ can be applied to any unicast communication and hence also to any multicast communication. Such a connection $C(i,E)$ is shown in a generic representation in FIG. 1c which brings into play a terminal $T_i$, a connection termination E which may be a conference bridge, a multi-point control unit or any other terminal.

There are many systems of inter-personal communications enabling users to exchange media streams from terminals connected by a communications network. Among these, we may cite, for example, the vanilla audio-conferencing system known as AGP (in French "Audio conference grand public") in the case where the switched telephone network (STN) is used or videophone and other chat systems when the Internet is used to exchange media streams.

Certain of these inter-personal communications systems propose a service for personalizing media streams exchanged during a same session that has been set up for inter-personal communication. This service, implemented during a step known as a media stream personalizing step enables a user to enhance communication with other users by inserting, for example, sound effects or audio jingles making the exchange of streams between users more attractive.

Figure 2:
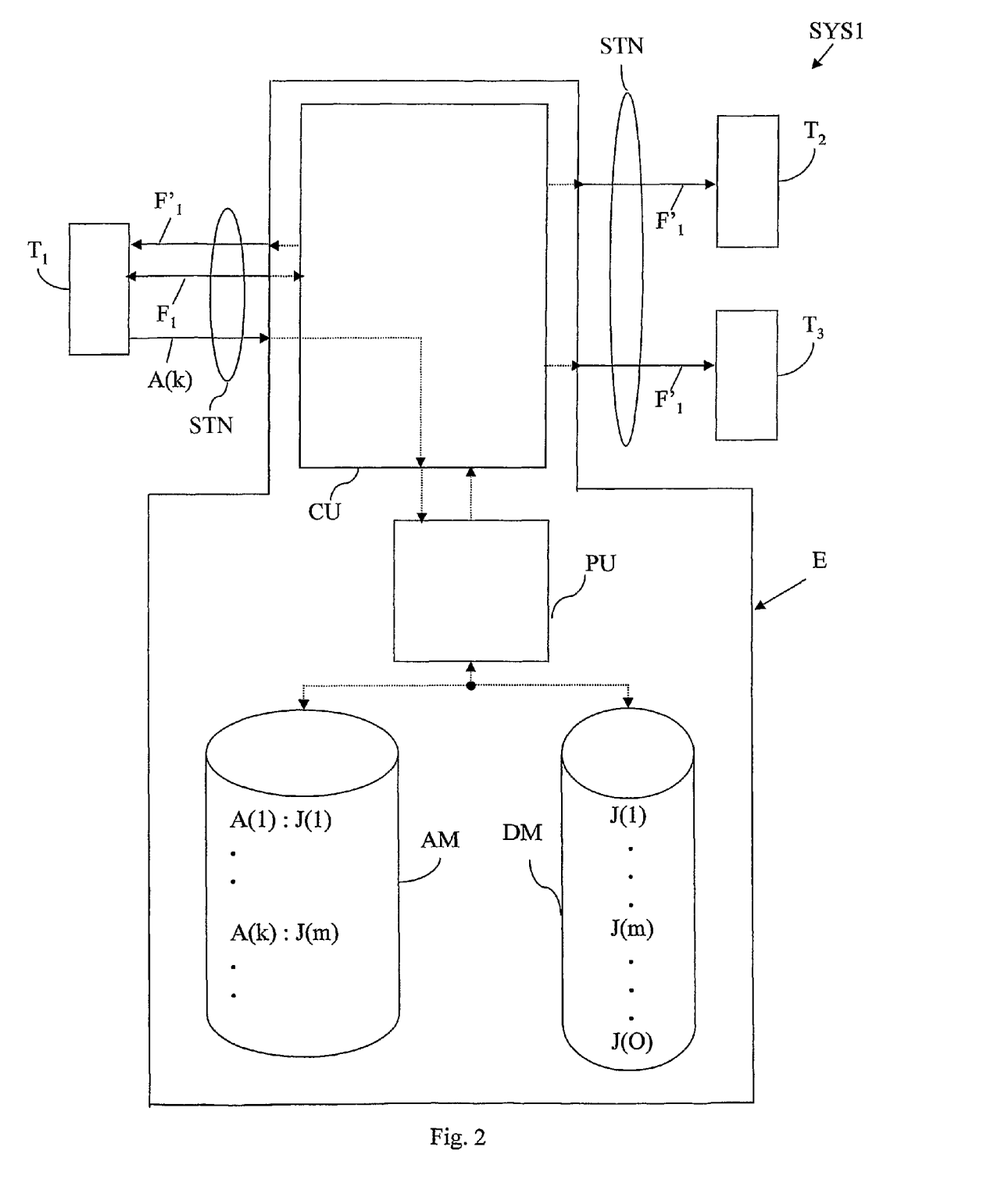
FIG. 2 is a block diagram of a system for the exchange of media streams during an inter-personal communication session according to the prior art.

FIG. 2 is a diagram of a system SYS1 for the exchange of media streams during an inter-personal communication session S according to the prior art, in this case the known audio conferencing system using the STN network called "3621 Rendez-vous par téléphone" (telephone appointment) by France Telecom. The system SYS1 comprises a connection termination E, in this case a conference bridge to which there are connected three terminals $T_1$, $T_2$ and $T_3$, in this case telephones. A user i exchanges an audio stream $F_1$ with the other users through the terminal $T_1$ which sends this stream to a communications unit CU of the connection termination E in charge of broadcasting this stream to the terminals $T_2$ and $T_3$. During the broadcasting of the stream $F_1$, the user i selects an activation command $A(k)$ by keying in a sequence of DTMF digits through the keyboard of the terminal $T_1$. The terminal $T_1$ then sends the activation command $A(k)$ to the connection termination E. Upon reception of the activation command $A(k)$, the personalizing step implemented by the communications unit CU starts by determining the audio jingle $J(m)$ corresponding to the activation command $A(k)$. To this end, a program execution unit PU compares the activation command $A(k)$ with each of the activation commands of a personalization table defining at lest one association between at least one activation command $A(k)$ and an audio jingle $J(m)$. The personalization table is stored in a memory AM comprising the connection termination E. Once determined, the jingle $J(m)$ associated with the activation command $A(k)$ is retrieved from a memory DM of the connection termination E by means of the program execution unit PU which then mixes the jingle $J(m)$ with the stream $F_1$ being broadcast. The resulting stream $F'_1$ is then sent to the terminals $T_2$ and $T_3$ so that the other users taking part in the audio-conferencing section S can hear the stream $F'_1$ thus personalized.

A step such as this for personalizing the media streams exchanged during a same inter-personal communications session is generally implemented at the connection termination E (conference bridge or multi-point control unit). Consequently, the setting up or updating of the personalizing service necessitates modifications in the connection termination E so that it can support the personalizing service or an updating of this service. These modifications prove most often to be financially very costly because of the substantial hardware and software resources implemented by this connection termination to support the broadcasting of streams.

Furthermore, such a step for personalizing media streams does not allow a user to define his own activation commands or his own personalization program. Thus, the associations connecting or linking an activation command to a personalization program are determined by the service provider and are therefore identical for all the users of a same inter-personal communications session. It is therefore not possible to speak of a genuine service for personalizing media streams. A personalizing service of this kind, which should be more attractive for a user, would consist in allowing each user to determine his own activation commands and his own programs.

SUMMARY

An aspect of the present invention provides for a method of exchanging media streams between a terminal and a connection termination during a same inter-personal communications session that averts the need to modify said connection termination for the implementing of a personalization method and enables a user to personalize a stream being broadcast from a personalization table which he has himself defined beforehand.

To this end, an aspect of the present invention provides a method for the exchange of media streams between a terminal used by a user and a connection termination during a same inter-personal communications session. Said method comprising a personalizing step consisting of the execution, following the selection by said user of an activation command, of a personalization program identified as being associated with said activation command by a personalization table for purposes of personalization of the media streams exchanged, is characterized in that it comprises a step of transmission of the media streams exchanged, which are liable to be personalized, to at least one relay address preliminarily defined for the personalizing of said streams. Furthermore, said method comprises a step of retransmission, from said relay address, of said streams addressed to said termination, that are personalized or not personalized depending on whether said personalizing step has been implemented or not implemented.

According to another aspect of the present invention, the method for exchanging media streams comprises a step for setting up said session, said setting-up step furthermore comprising:
- a step of retrieval of a description of each type of media streams liable to be exchanged during said session,
- a step for obtaining said personalization table,
- a step of identification, among said types of media streams thus retrieved, of those streams that are liable to be personalized by at least one of the personalization programs defined by said personalization table thus obtained,
- a step of association of a relay address with each of said types of media streams thus identified, and
- a step for obtaining, by said terminal, of said relay address or each of said relay addresses.

According to one embodiment of the present invention, the description of the types of media streams is defined by the SDP (session description protocol) defined by the request for comments RFC 2327 drawn up by the IETF.

According to one embodiment of the present invention, said types of media streams likely to be exchanged during said session are solely the types of media streams that said terminal can receive and present to said user.

According to one embodiment of the present invention, said activation commands, personalization programs and associations between said activation commands and said personalization programs constituting said personalization table are created by said user.

According to another aspect of the present invention, the identification of said personalization program is followed by a step for validation of the execution of said personalization program thus identified. This characteristic is particularly advantageous when several personalization programs are executed simultaneously with a media stream being broadcast because it prevents the combination of personalization programs from degrading this media stream, for example by making it inaudible.

According to one embodiment of the present invention, the step for setting up said session furthermore comprises a step of verification, on the basis of a piece of information of identification of said user, that said user has taken out a subscription. This characteristic is advantageous for a service provider who can thus limit access to the personalization service of media streams to users who are contractually bound to this service provider.

According to one embodiment of the present invention, said description of each type of media stream liable to be exchanged during said session is extracted from a message conveyed by a first signaling signal.

According to one embodiment of the present invention, each activation command is conveyed by a second signaling signal.

According to one embodiment of the present invention, said identification information of said user is extracted from a message conveyed by a third signaling signal.

According to one embodiment of the present invention, said first, second, and third signaling signals are compliant with the SIP protocol.

According to one embodiment of the present invention, a stream personalization program consists in mixing said media stream with a piece of audio and/or visual data, or in applying a sound and/or visual effect to said media stream.

An aspect of the present invention also relates to a device for the personalization of media streams exchanged between a terminal used by a user and a connection termination during a same inter-personal communications session, said device comprising personalizing means enabling the execution, following the selection by said user of an activation command, of a personalization program associated with said activation command by a personalization table for purposes of personalization of the media streams exchanged, said device being characterized in that it comprises means to receive, at least one preliminarily defined relay address, said media streams which said device is liable to personalize, and means for the retransmission, from said relay address, of said streams to said connection termination (E), that are personalized or not personalized depending on whether said personalization means have been implemented or not implemented.

Furthermore, an aspect of the present invention relates to a system for exchanging media streams between a terminal used by a user and a connection termination during a same inter-personal communication session, said terminal being linked to the connection termination by a first communication network, characterized in that it comprises a personalization device, associated firstly with said terminal and connected secondly to said connection termination by a second communications network.

According to one embodiment of the present invention, said terminal and said personalization device are associated by a third communications network.

According to one embodiment of the present invention, said personalization device is a home gateway, said third communications network is a local area network and said first and second communications networks are IP type networks.

According to one embodiment of the present invention, said personalization device is a network apparatus, and said first, second and third communications networks are IP type networks Finally, an aspect of the present invention relates to a computer program for the exchange of media streams between a terminal used by a user and a connection termination during a same inter-personal communications session, characterized in that it implements the steps of the exchange method compliant with one of the embodiments of the present invention described here above.

BRIEF DESCRIPTION OF THE DRAWINGS

The characteristics mentioned here above as well as others shall appear more clearly from the following description of an embodiment, said description being made with reference to the appended drawings, of which.

DETAILED DESCRIPTION OF ILLUSTRATIVE EMBODIMENTS

An inter-personal communication session according to an embodiment of the present invention describes all the parameters linked to each connection between a terminal $T_i$ and a connection termination E involved in a communication, and all the information related to the media streams that are exchanged, especially their type, their encoding format, etc. The term "media stream" is understood to mean any type of digital stream such as for example audio streams, video streams, audio-visual streams or applications such as computer programs.

Figure 3:
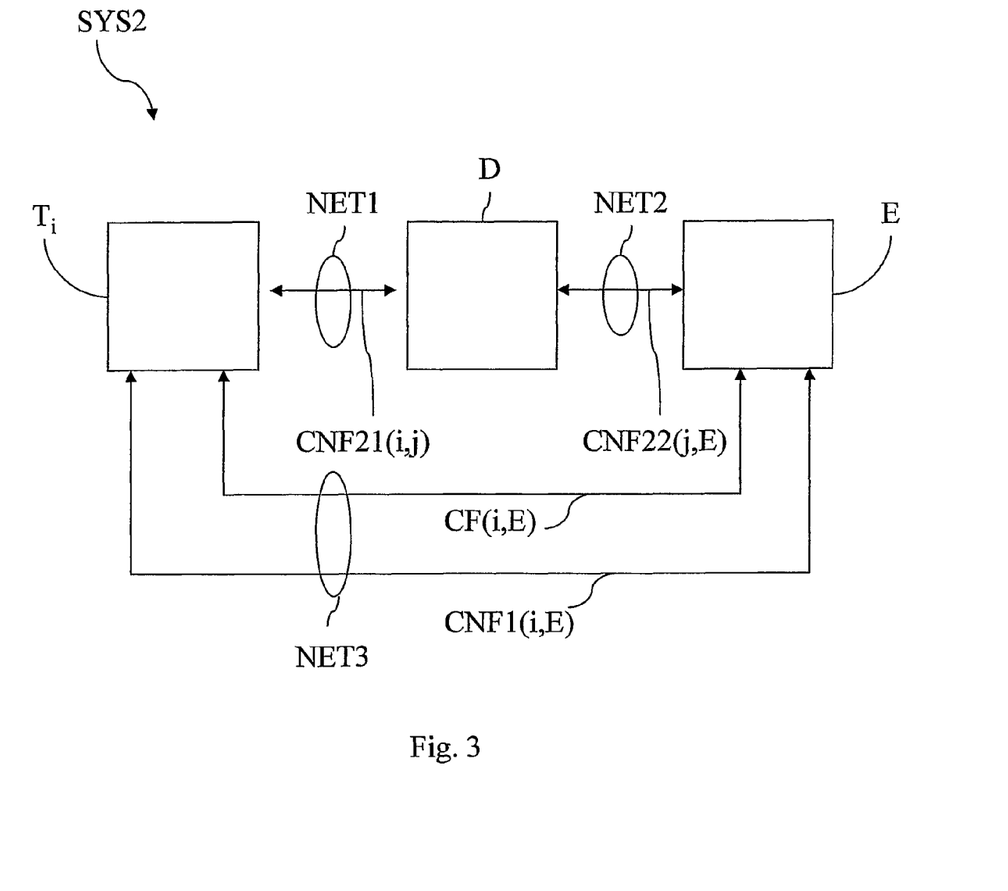
FIG. 3 is a block diagram of an example of an embodiment of a system for the exchange of streams exchanged during a same inter-personal communication session according to an embodiment of the present invention.

FIG. 3 is a block diagram of an exchange system SYS2 of media streams during a same inter-personal communication session according to an embodiment of the present invention. This exchange system SYS2 comprises a terminal $T_i$ used by a user i who wishes to access the personalization service, a personalization device D described with reference to FIG. 5, and a connection termination E.

The personalization device D is connected to the terminal $T_i$ by a communications network NET1 and to the connection termination E by a communications network NET2. The terminal $T_i$ is also connected to the connection termination E by a communications network NET3.

The personalization device D is, in a non-exhaustive way, a home gateway or a network operator. In the case of a home gateway, the communications network NET1 is a local area network. The communications networks NET2 and NET3 are then of the IP (Internet protocol) type for example. In the case of network equipment, such as for example a server of Internet services, the communications networks NET1, NET2 and NET3 are of the IP type for example.

The terminal $T_i$ is non-exhaustively an office computer or a digital telephone which can also be an analog telephone should the personalization device D be a home gateway. The home gateway then comprises means to convert analog data into digital data and vice versa.

The user terminal $T_i$ is connected to the connection termination E by a reliable connection (without data loss) CF(i,E) and, as shall be seen here below during the description of the method of data exchange with respect to FIG. 4, by a connection that is non-reliable (but enables real-time carriage of the data) CNF1(i,E). The terminal $T_i$ is also connected to the personalization device D by one or more non-reliable connections CNF21(i,j) set up between the terminal $T_i$ and an address here below called a relay address j of the personalization device D. Finally, the personalization device D is connected to the connection termination E by one or more non-reliable connections CNF22(j,E) set up between each relay address j of the personalization device D and the connection termination E.

For example, should the communications network NET1, NET2 and/or NET3 be IP type networks, the connection CF(i,E) is made reliable by the use of the transmission control protocol (TCP) defined by the request for comments RFC 793 of the IETF (Internet Engineering Task Force). In this case, the connection CNF1(i,E) and/or the connections CNF21(i,j) and CNF22(j,E) are set up by the non-reliable transport protocol UDP (User Datagram Protocol) associated with the real-time transport protocol RTP (Real Transport Protocol) and, if necessary, by the real-time control protocol (RTCP) defined respectively by the requests for comments RFC 768, RFC 1889 and RFC 3605 of the IETF.

The media streams are exchanged between the terminal $T_i$ and the connection termination E either by means of the connection CNF1(i,E) or by means of the connections CNF21(i,j) and CNF22(j,E), as shall be seen in greater detail with reference to the exchange method described with reference to FIG. 4. The signals used to convey the data other then media streams are carried by signals known as signaling signals. These signaling signals are conveyed by the connection CF(i, E).

Figure 4:
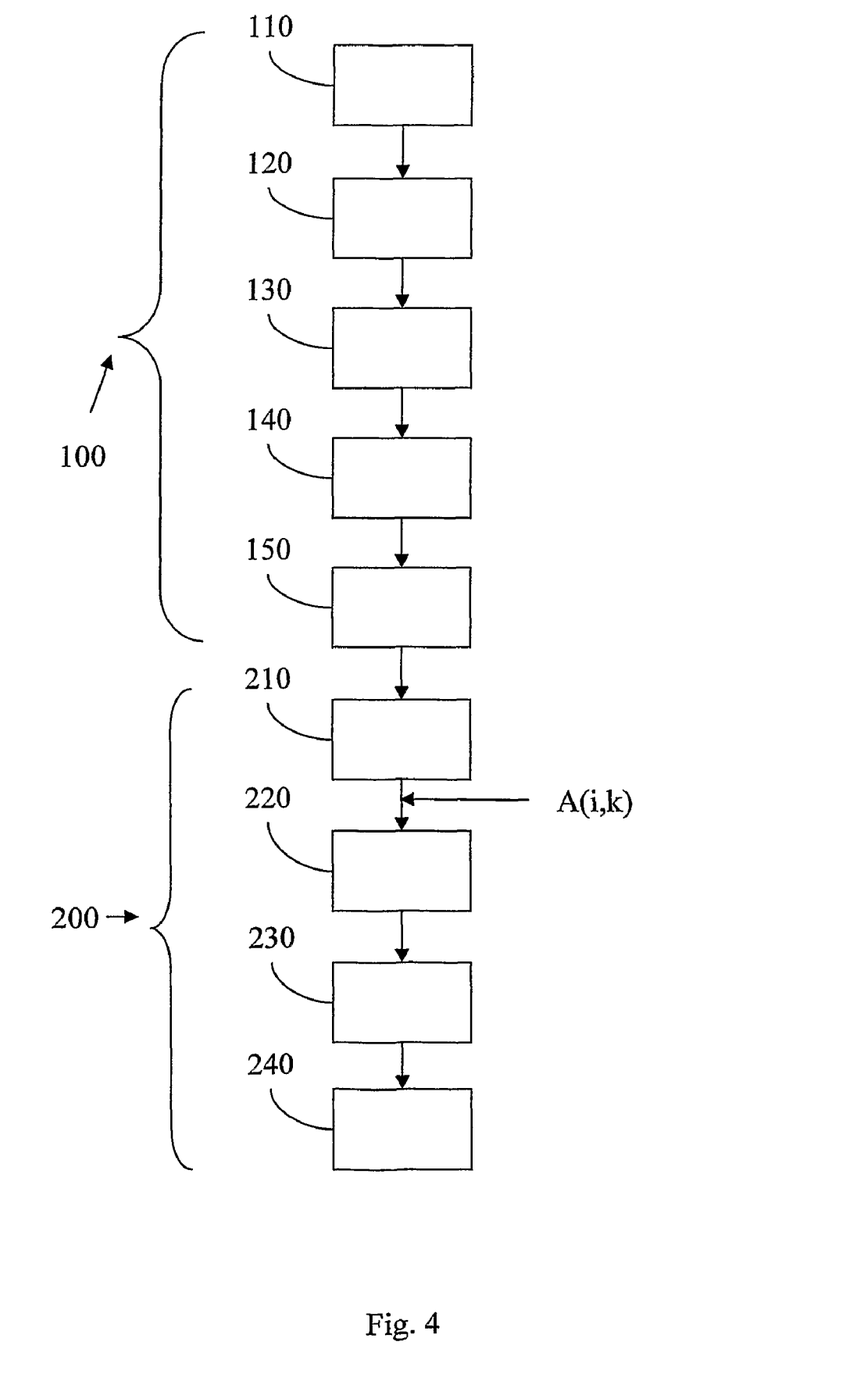
FIG. 4 is a diagram showing the steps of the media stream exchange method according to an embodiment of the present invention.

FIG. 4 is a diagram of the steps of the media stream exchange method according to an embodiment of the present invention. This exchange method comprises a step 100 for setting up an inter-personal communication session S and a personalization step 200. The setting-up step 100 furthermore comprises sub-steps 110 to 150.

During a step 110, a description of each of the types of media streams likely to be exchanged during the session S is retrieved. These types of media streams may, for example, have been determined according to the hardware resources of the terminal $T_i$ (resources determining the type of media stream that the terminal $T_i$ is capable of receiving and presenting to the user i) and/or according to the capacities of a communications network (for example the communications network NET2) and/or have been specified by the user i himself.

According to one embodiment of the present invention, each type of media stream is described by using the SDP format.

According to one embodiment of the present invention, the SDP descriptions of the type of media stream are carried by a message "INVITE" or "180 RINGING" of the SIP protocol. This message is conveyed by a signaling signal called a first signaling signal.

The step 110 is then followed by a step 120 for obtaining the personalization table.

According to one embodiment of the present invention, the personalization table is obtained from a memory and, according to one variant of this embodiment, from a communications network such as for example the communications network NET2.

According to one embodiment of the present invention, the personalization table obtained is a personalization table $Pr_i$ preliminarily defined by the user i. To this end, a personalization table $Pr_i$ is associated, prior to the implementation of the personalization step, with each user i who, according to his wishes, can modify it by adding/eliminating an association between an activation command and a personalization program of the personalization table and/or by adding new activation commands and/or new personalization programs to or from an already-existing association and/or by creating new associations. The personalization table $Pr_i$ defines at least one association between an activation command A(i,k), for example a command coming from a man/machine interface such as a sequence of DTMF (dual tone multiple frequency) digits or a voice command, and a stream personalization program T(m) which may possibly require a piece of data called personalization data D(n) for example of the audio and/or video type. The index i of the command A(i,k) is a reminder of that user i who is associated with this command and the second index k refers to the $k^{th}$ command of the personalization table of this user. A user can also define a deactivation command which is then associated with the cancellation of the execution of a program of personalization of a type of stream being broadcast.

Let us take the example of two personalization tables called $Pr_1$ and $Pr_2$ defined as follows. The personalization table $Pr_1$ consists of two associations. The first association is defined by an activation command A(1,1), of a program T(1) for personalizing audio or audio-visual type streams that requires an audio type piece of data D(1). For example, the program T(1) consists in mixing an audio type stream or the audio part of an audio-visual type stream being broadcast with a piece of audio type data D(1) which for example may be ambiance music. The second association is defined by an activation command A(1,2) and a program T(2) for personalizing audio type and audio-visual type streams, consisting for example in creating a sound effect such as an echo. The personalization table $Pr_2$ consists of a single association which is defined by an activation command A(2,1) and a program T(3) for the personalization of video and/or audio-visual type streams requiring a piece of personalization data D(2). For example, the program T(3) consists in adding a border (defined by the piece of data D(2)) to each image of a video type or audio-visual type stream.

Returning to FIG. 3, the step 120 for obtaining the personalization table is then followed by a step 130 during which an identification is carried out, from among the types of media streams liable to be exchanged during the session S, of those streams that are liable to be personalized according to one of the personalization programs T(m) defined by the personalization table thus obtained.

Let us take the example in which the personalization table obtained has been defined beforehand by a user and where a terminal $T_1$ is liable to exchange audio type, audio-visual type and application type streams during the session S and where a second terminal $T_2$ is liable to exchange video and audio-visual type streams during the same session S. The terminal $T_1$ is used by a user 1 and the user terminal $T_2$ is used by another user 2. These two users have a stream personalization table that is associated with them, in this case the personalization table $Pr_1$ and the personalization table $Pr_2$ already defined here above. According to this example, at the end of the step 130, the audio and audio-visual type streams are identified as being capable of being personalized according to one of the programs defined by the personalization table $Pr_1$ and the audio-visual and video type streams are identified as being liable to be personalized according to one of the programs defined by the personalization table $Pr_2$. The application type streams are not liable to be personalized during the session S because the personalization table $Pr_1$ does not define any association between an activation command and a media stream personalization program of this type.

The step 130 is followed by a step 140 during which at least one relay address j and possibly a port are associated with the types of media streams thus identified. A relay address is for example an IP (Internet Protocol) address or a memory address of the personalization device D.

The step 140 is finally followed by a step 150 in which the terminal $T_i$ obtains a piece of information defining the relay address j or each relay address j thus associated, the address to which the terminal $T_i$ will send the personalization device D, by means of at least one connection CNF21(i,j), the media streams whose type is liable to be personalized by at least one personalization program defined by the personalization table. It can be noted that, should it be the case that types of media streams are not identified as being capable of being personalized by one of these personalization programs, these types of media stream will be sent directly to the connection termination E by means of the connection CNF1(i,E) without going through a relay address of the personalization device D.

The fact of using a relay address makes it possible to shift the implementation of the execution of the media stream personalization program to a device other than the connection termination E, thus preventing any modification of this connection termination E for which it supports the personalization service.

Once the inter-personal communication session S has been established, the step 100 is followed by a step 200 for personalizing a media stream. The personalization step 200 furthermore comprises steps 210 to 240.

During the step 210, one of the media streams liable to be personalized is transmitted to the relay address j which was associated with it in the step 100 for setting up the session S described here above.

Should the user i make a selection, through a man/machine interface of the terminal $T_i$, of a command for the activation of a personalization program T(m) of the media stream transmitted (or being transmitted), this activation command being transmitted to the personalization device D, the step 210 is followed by the step 220 during which the personalization program T(m) is identified from the activation command thus transmitted and a personalization table for example memorized in said personalization device D.

According to one embodiment of the present invention, the identification of the personalization program T(m) is done from the activation command thus transmitted and the personalization table $Pr_i$ of the user i.

According to one embodiment of the present invention, a signaling signal called a second signaling signal is received. The second signaling signal conveys a message "INFO" of the SIP protocol, this message containing the activation command. This message contains for example a sequence of DTMF digits and another command of a man/machine interface of the user terminal $T_i$ such as a voice command which defines the activation command.

According to one embodiment of the present invention, the step 220 is followed by a step 230 for the validation of the execution of the personalization program T(m) thus identified. During this step 230, it is ascertained that the media stream transmitted to the relay address j has not undergone the effect of at least one personalization program being executed.

Should no personalization program be in execution, the step 230 is followed by the execution of the program for personalizing the media stream transmitted. To this end, should the execution of the personalization program require a piece of personalization data D(n), the execution of the program is preceded by the retrieval of the piece of personalization data from, for example, a memory or a communications network.

It can be noted that the execution of a program is limited in time for example by the duration of the session S and that the effect of a program on a type of stream being broadcast can be stopped by a user i following the dispatch by the user terminal $T_i$ of a deactivation command defined by the personalization table $Pr_i$.

Should at least one personalization program be in execution, it is ascertained during the step 230 that the superimposition of the effect of the personalization program T(m) on the effect of this personalization program under execution is not deleterious to the semantic content conveyed by the media stream being broadcast. These instances of superimposition of effects may, for example, be defined a priori by an operator of the personalization service or by a provider of stream personalization programs. Indeed, it may happen that two user terminals send a command for the activation of two different personalization programs or that one terminal sends a first activation command and then a sequence of activation commands before the execution of the first personalization program comes to an end. For example, a user i may have requested the introduction (first program) of ambiance music (personalization data) into an audio-visual type stream being broadcast and may wish to apply an echo effect (second program). The result being hardly audible, such a combination is considered to be deleterious and the execution of a second program creating the echo effect is not validated.

Should the execution of the personalization program T(m) be not validated, the step 230 is followed by a step 240 during which the non-personalized media stream is transmitted to the connection termination E by means of a connection CNF22(j,E).

If not, the step 230 is followed by a step 240 during which the personalized media stream is transmitted to the connection termination E by means of a connection CNF22(j,E).

According to one embodiment of the present invention, the personalization service is not accessible to any user of an inter-personal communication session but is reserved to subscribers, i.e. to users who have taken out a subscription beforehand with, for example, an Internet access provider. During the subscription phase, a default personalization table is associated with a subscriber who may modify it as he wishes. According to this embodiment, during the set-up step 100, it is ascertained, from a piece of user information i, that a user i has taken out a subscription to the personalization service. Should it be determined that the user i is not a subscriber to the personalization service, the set-up step 100 of the session S comes to an end.

According to one embodiment of the present invention, the piece of information identifying the user i is conveyed by a message "INVITE" or "180 RINGING" of the SIP (Session Initiation Protocol) defined by the RFC 3261 set up by the IETF (Internet Engineering Task Force). This message is conveyed by a signaling signal called a third signaling signal.

Figure 5:
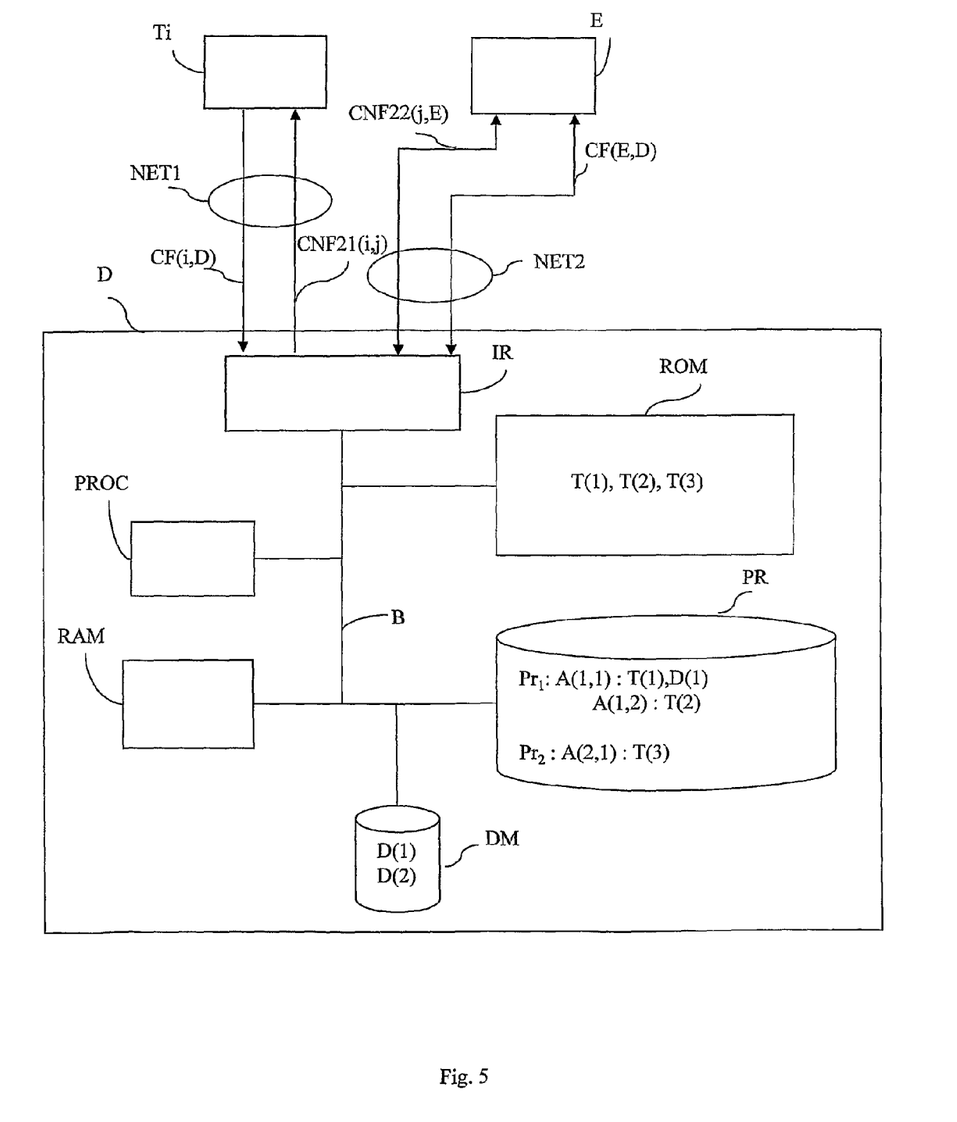
FIG. 5 is a block diagram of an example of an embodiment of a device for the personalization of streams exchanged during a same inter-personal communication session according to an embodiment of the present invention.

FIG. 5 is a block diagram of an example of a device D for the personalization of media streams exchanged during an inter-personal communication according to the present invention. The personalization device D is non-exhaustively an office computer, a telephone or a mobile terminal. The personalization device D comprises a communications bus B to which there are connected a processor PROC, a non-volatile or read-only memory ROM, a random access memory RAM, a database DM, a database PR, and a network interface IR connected firstly to the communications network NET1 and secondly to the communications network NET2.

The non-volatile memory ROM stores the programs and digital data enabling, inter alia, the implementation of the steps of the personalization method in compliance with those described previously with reference to FIG. 4. Furthermore, this memory comprises programs enabling the encoding/decoding of the media streams and of the programs for personalizing these streams. More generally, the ROM memory is readable by the processor PROC, whether integrated or not into the personalization device D, and may be detachable.

According to one embodiment of the personalization device D, the personalization programs and/or the media stream encoding/decoding programs are retrieved through the interface IR connected for example to a program server through the communications network NET2 or connected to the terminal $T_i$ through the communications network NET1. These programs are conveyed respectively either by means of a reliable connection CF(E,D), or by means of the reliable connection CF(i,D) shown in FIG. 5. These connections are set up solely for the transfer of these programs.

The database DM stores audio and/or video personalization data D(n) for example a piece of audio data D(1) and a piece of video data D(2). More generally, the database DM is readable by the processor PROC whether it is integrated or not into the personalization device D, and may be removable.

According to one embodiment of the personalization device D, the pieces of personalization data D(n) are retrieved through the network interface IR connected for example to a server of audio-visual data through the communications network NET2 or connected to the terminal $T_i$ through the communications network NET1 using respectively the connections CF(E,D) and CF(i,D).

The data base PR stores at least one personalization table, for example the personalization tables $Pr_1$ and $Pr_2$ described here above. More generally, the data base PR is readable by the processor PROC whether it is integrated or not into the personalization device D, and may be removable.

According to one embodiment of the personalization device D, the personalization tables are retrieved through the network interface IR connected for example to a server of personalization tables through the communications network NET2 or connected to the terminal $T_i$ through the communications network NET1 using respectively the connections CF(E,D) and CF(i,D).

The personalization device D also has means to set up and manage the reliable and non-reliable connections. Each connection CNF21(i,j) or CNF22(j,E) is used for the real-time exchanges of different types of media streams exchanged once the session S has been set up. For example, should the communications networks NET1 and NET2 be of the IP type, the non-reliable transport protocol UDP associated with the real-time transport protocol RTP and, as the case may be, with the real-time transport control protocol RTCP is used.

According to one embodiment of the personalization device D, certain components of the personalization device D such as the database DM and/or the database PR and/or the ROM are resources of the terminal $T_i$ to which the personalization device D obtains access through the communications network NET1 by means of the connection CF(i,D).

The signaling signals are conveyed between the user terminal $T_i$ and the connection termination E by the connection CF(i,E) (shown in FIG. 3) made reliable for example by the use of a TCP/IP type protocol if the communications network NET2 is of the IP type.

When the personalization device D is powered on, the programs according to an embodiment of the present invention are transferred into the random-access memory or RAM which then contains the executable code of an embodiment of the invention as well as the data needed to implement an embodiment of the invention.

Figure 6:
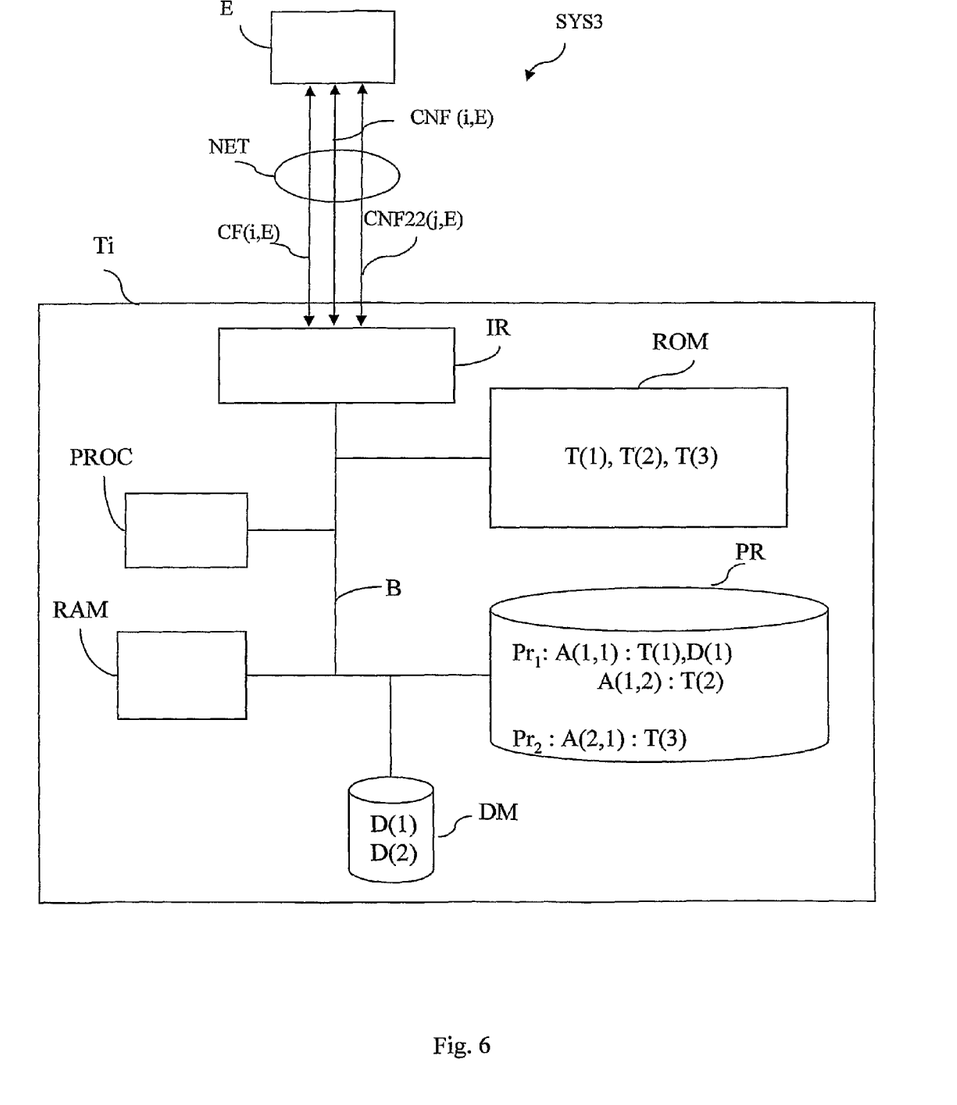
FIG. 6 is a block diagram of another example of an embodiment of a device for personalizing streams exchanged during a same inter-personal communication session according to an embodiment of the present invention.

FIG. 6 is a block diagram of another exemplary embodiment of an exchange system according to an embodiment of the present invention. The exchange system SYS3 comprises a terminal $T_i$ and a connection termination E connected by a communications network NET. The terminal $T_i$ comprises the means implemented by the personalization device D described with reference to FIG. 5. The connections CNF21

(i,j) no longer have any reason to exist. The only connections that remain are the connections CNF22(j,E), CNF1(i,E) and CF(i,E) described here above.

Although the present disclosure has been described with reference to one or more examples, workers skilled in the art will recognize that changes may be made in form and detail without departing from the scope of the disclosure and/or the appended claims.

The invention claimed is:

1. Method for exchanging media streams between a terminal used by a user and a connection termination during a same inter-personal communications session, said method comprising:
   a personalizing step comprising, following a selection by said user of an activation command, executing a personalization program identified as being associated with said activation command by a personalization table for purposes of personalization of the media streams exchanged,
   a step of transmission of the media streams exchanged, which are liable to be personalized, to at least one relay address preliminarily defined for the personalization of said streams, and
   a step of retransmission, from said relay address, said streams addressed to said termination.

2. Method for of exchanging media streams according to claim 1, wherein the method comprises for setting-up a session, said setting-up step furthermore comprising:
   a step of retrieval of a description of each type of media stream liable to be exchanged during said session,
   a step of obtaining said personalization table,
   a step of identification, among said types of media streams thus retrieved, of those streams that are liable to be personalized by at least one of the personalization programs defined by said personalization table thus obtained,
   a step of association of a relay address with each of said types of media streams thus identified, and
   a step of obtaining, by said terminal, of said relay address or each of said relay addresses.

3. Method for exchanging media streams according to claim 2, wherein the description of the types of media streams is defined by an SDP protocol.

4. Method for exchanging media streams according to claim 2, wherein said types of media streams liable to be exchanged during said session are solely the types of media streams that said terminal can receive and present to said user.

5. Method for exchanging media streams according to claim 2, wherein the step for setting up said session furthermore comprises a step of verification, on a basis of a piece of information of identification of said user, that said user has taken out a subscription.

6. Method for exchanging media streams according to claim 5, wherein said identification information of said user is extracted from a message conveyed by a signaling signal.

7. Method for exchanging media streams according to claim 6, wherein said first signaling signal is compliant with an SIP protocol.

8. Method for exchanging media streams according to claim 2, wherein said description of each type of media stream liable to be exchanged during said session is extracted from a message conveyed by a signaling signal.

9. Method for exchanging media streams according to claim 8, wherein said first signaling signal is compliant with an SIP protocol.

10. Method for exchanging media streams according to claim 8, wherein the personalization program comprises mixing said media stream with a piece of audio and/or visual data, or in applying a sound and/or visual effect to said media stream.

11. Method for exchanging media streams according to claim 1, wherein said activation commands, personalization programs and associations between said activation commands and said personalization programs constituting said personalization table are created by said user.

12. Method for exchanging media streams according to claim 1, wherein the identification of said personalization program is followed by a step of validation of the execution of said personalization program thus identified.

13. Method for exchanging media streams according to claim 1, wherein each activation command is conveyed by a signaling signal.

14. Method for exchanging media streams according to claim 13, wherein said first signaling signal is compliant with an SIP protocol.

15. Device for personalization of media streams exchanged between a terminal used by a user and a connection termination during a same inter-personal communications session, said device comprising:
   personalizing means enabling execution, following a selection by said user of an activation command, of a personalization program associated with said activation command by a personalization table for purposes of personalization of the media streams exchanged,
   means to receive, at least one preliminarily defined relay address, said media streams which said device is liable to personalize, and
   means for retransmission, from said relay address, of said streams to said connection termination.

16. System for exchanging media streams between a terminal used by a user and a connection termination during a same inter-personal communication session, said terminal being linked to the connection termination by a first communication network wherein the system comprises:
   a personalization device associated firstly with said terminal and connected secondly to said connection termination by a second communications network, wherein the personalization device comprises:
   personalizing means enabling execution, following a selection by said user of an activation command, of a personalization program associated with said activation command by a personalization table for purposes of personalization of the media streams exchanged,
   means to receive, at least one preliminarily defined relay address, said media streams which said device is liable to personalize, and
   means for retransmission, from said relay address, of said streams to said connection termination.

17. System for exchanging media streams according to claim 16, wherein said terminal and said personalization device are associated by a third communications network.

18. System for exchanging media streams according to claim 16, wherein said personalization device is a home gateway, and said third communications network is a local area network and said first and second communications networks are IP type networks.

19. System for exchanging media streams according to claim 16, wherein said personalization device is a network apparatus, and said first, second and third communications networks are IP type networks.

20. A computer program stored in a memory for exchanging media streams between a terminal used by a user and a connection termination during a same inter-personal communications session, wherein the computer program, when executed, implements steps comprising:

a personalizing step comprising, following a selection by said user of an activation command, executing a personalization program identified as being associated with said activation command by a personalization table for purposes of personalization of the media streams exchanged, a step of transmission of the media streams exchanged, which are liable to be personalized, to at least one relay address preliminarily defined for the personalization of said streams, and a step of retransmission, from said relay address, said streams addressed to said termination.

* * * * *